United States Patent [19]

Olzog

[11] Patent Number: 4,792,005
[45] Date of Patent: Dec. 20, 1988

[54] SCALE AND FLEXURE ASSEMBLY
[75] Inventor: Detlef Olzog, Norwalk, Conn.
[73] Assignee: The A. H. Emery Company, New Canaan, Conn.
[21] Appl. No.: 136,853
[22] Filed: Dec. 22, 1987
[51] Int. Cl.$^4$ .......................... G01G 3/08; G01G 5/04
[52] U.S. Cl. ................................... 177/229; 177/208; 177/DIG. 9
[58] Field of Search .................. 177/211, 229, DIG. 9

[56] References Cited

U.S. PATENT DOCUMENTS

| Re. 27,263 | 5/1971 | Garnett . | |
|---|---|---|---|
| 2,868,535 | 4/1959 | Ruge . | |
| 3,082,834 | 2/1963 | Ellis . | |
| 3,616,690 | 10/1971 | Harden . | |
| 3,658,143 | 2/1972 | Schwartz . | |
| 3,734,218 | 7/1973 | Kupper . | |
| 3,743,039 | 8/1973 | Vogt . | |
| 3,955,638 | 3/1976 | Wasko . | |
| 3,985,025 | 11/1976 | Ormond . | |
| 4,009,608 | 8/1977 | Ormond . | |
| 4,020,686 | 11/1977 | Brendel . | |
| 4,022,288 | 2/1977 | Canevari . | |
| 4,078,624 | 6/1978 | Bradley . | |
| 4,150,729 | 3/1979 | Ormond . | |
| 4,174,760 | 5/1979 | Curchod | 177/211 |
| 4,234,049 | 5/1980 | Oliver | 177/229 |
| 4,300,648 | 3/1981 | Gallo . | |
| 4,448,085 | 1/1984 | Lee . | |

Primary Examiner—George H. Miller, Jr.
Attorney, Agent, or Firm—St. Onge Steward Johnston & Reens

[57] ABSTRACT

A flexure assembly is provided for mounting a load-receiving platform to a fixed base, said base having associated therewith a force sensing device for coupling to said platform. The assembly comprises at least one flexure member including a stack of at least two flexible leaves. The stack is rigidly coupled along a first side thereof to said platform, and said stack is rigidly coupled along an opposite side thereof to said base, said stack being inclined from the vertical and being sufficiently rigid to support said platform from said base. The stack is further sufficiently flexible to tend to deflect and traverse a slight arc in response to a loading force being applied to said platform by receiving a load thereon, each of said leaves having a substantially planar shape when in a nondeflected state and lying in substantially parallel planes when in the nondeflected state, whereby said force sensing device can be coupled to said platform along a substantially horizontal axis to thereby render an indication of the magnitude of said load.

24 Claims, 5 Drawing Sheets

SCALE AND FLEXURE ASSEMBLY

BACKGROUND OF THE INVENTION

A. Field of the Invention

The present invention relates to a scale assembly for weighing or measuring mass. More particularly, the scale assembly of the present invention includes angled flexure members to support a load receiving platform, whereby the loading force can be separated into vertical and horizontal components and the magnitude of the loading force can be determined by measuring the magnitude of the horizontal component. The flexure members are laminated so that the horizontal component is substantially linearly related to the magnitude of the loading force throughout the weighing range of the scale.

B. Description of the Prior Art

Mass measuring apparatus using angled flexure means are known in the prior art. U.S. Pat. No. 4,234,049 to Oliver shows a hopper, a load sensing device, and a linkage operatively connected to the load sensing device. The hopper is connected by linkage means that are inclined to the vertical, and a force is applied in the horizontal direction to the load sensing device. Oliver is designed for batch weighing and is not suitable for weighing constant heavy loads, such as industrial tanks.

U.S. Pat. No. 4,174,760 to Curchod shows a scale construction comprising a pair of spaced substantially rigid plates offset with respect to each other and supported by means of flexure members extending therebetween. Flexure means are interposed at an oblique angle to permit one of the plates to move laterally relative to the other and closer to the other in response to application of a body upon the top plate. A strain gauge means is carried between the plates to be responsive to weight applied on the top plate. However, Curchod is designed for a bathroom scale device and is not suitable for accurately weighing relatively heavy industrial loads over a wide weight range.

U.S. Pat. No. Re. 27,263 to Garnett shows a weigher head for use in high speed, high precision, rotary weighing machines. A system of leaf springs is substituted for the usual means by which a sale beam within the head housing is pivoted. Upper and lower supporting members are resiliently secured at their ends to one another by pairs of upwardly inclined, laminated fiberglass leaf springs. The weighing function is accomplished by transmitting a downwardly directed force into a weighing mechanism. Neither is Garnett designed or suitably adapted for accurately weighing relatively heavy industrial loads over a wide range.

SUMMARY OF THE INVENTION

In accordance with the present invention, a flexure assembly is provided for mounting a load-receiving platform to a base. The assembly comprises at least one flexure member having a stack of at least two flexible leaves lying in substantially parallel planes. The stack is inclined from the vertical and is sufficiently flexible to deflect and traverse a slight arc in response to a loading force. A load sensing device can then be coupled to the platform along a horizontal input axis to receive a horizontal component corresponding to the downwardly directed loading force and thereby render an indication of the magnitude of the loading force.

In a particularly preferred embodiment, the flexible leaves in the stack are separated by shims at opposite ends, so that the leaves do not touch or rub against each other over the major portions of their surfaces throughout the range of deflections.

In a further preferred embodiment in accordance with the present invention, a scale assembly is provided using a plurality of these flexure assemblies, with a hydraulic load cell being placed in substantially the symmetrical center of the platform to measure the horizontal component of the platform deflection related to the loading force.

In a further preferred embodiment in accordance with the present invention, the scale assembly is provided with adjusting means for calibrating the scale by adjusting the horizontal displacement between the flexure assembly and the platform.

It is an object of the present invention to provide a flexure assembly that can be used to support a weighing platform and create a horizontal force component that can be measured as a reliable indication of the magnitude of the loading force.

It is an object of the present invention to provide a flexure and scale assembly with less zero shift and improved linear response.

It is a further object of the present invention to provide a flexure assembly that can be used to support heavy loads, while providing a relatively linear relationship over the weighing range between the loading force and the horizontal component thereof.

It is a further object of the present invention to provide a scale assembly that can be used to give a reliable indication of the magnitude of the loading force over a wide range of loading forces.

It is a further object of the present invention to provide a scale assembly for relatively heavy industrial loads that can be calibrated in an efficient manner.

Further objects and advantages of the present invention will become apparent from the following description of the drawings and the preferred embodiments.

DETAILED DESCRIPTION OF THE PREFERRED EMBODIMENT

Figure 1:
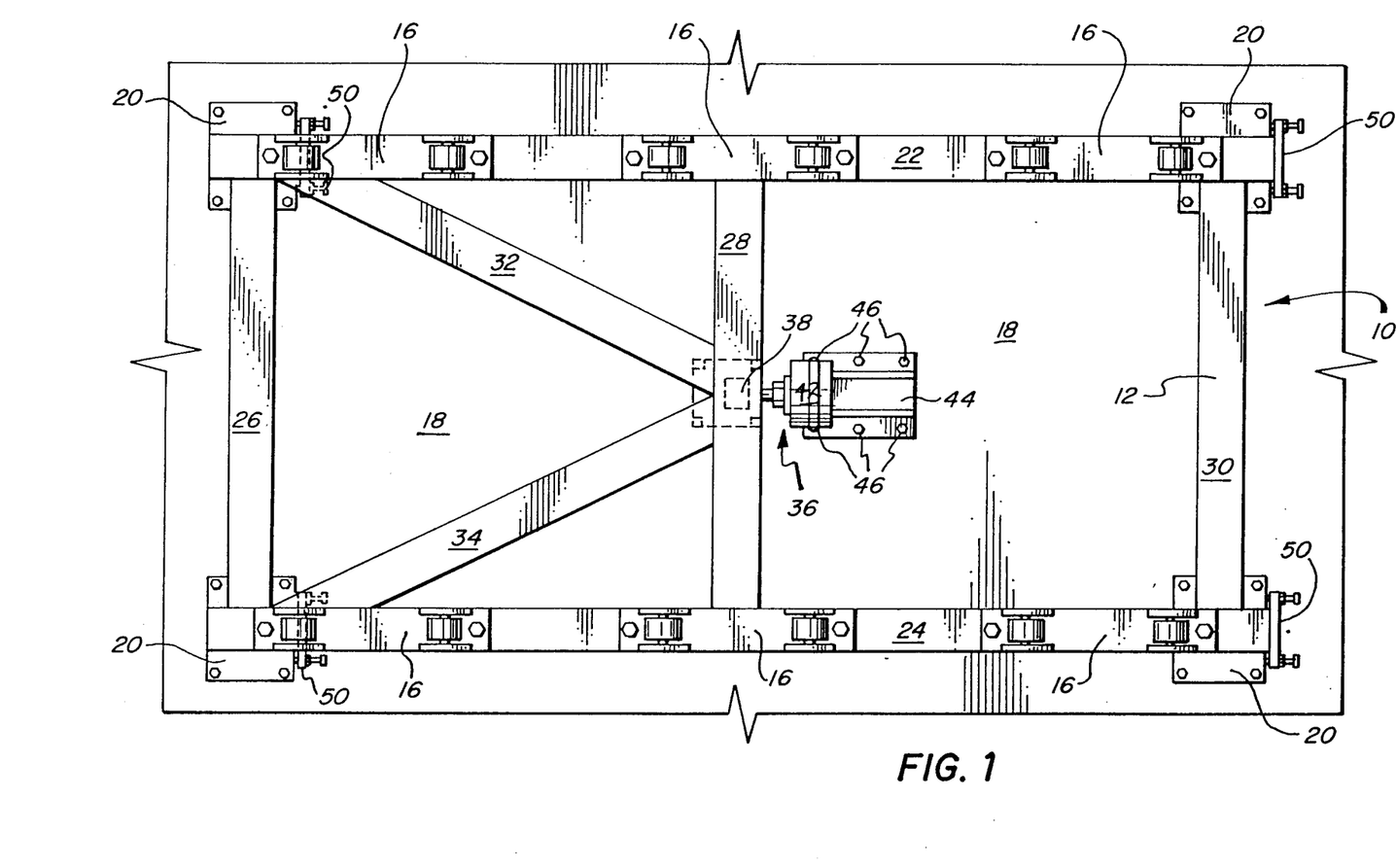
FIG. 1 is a top view of a preferred embodiment of the scale assembly of the present invention, shown without a load thereon for clarity and simplicity.
Figure 2:
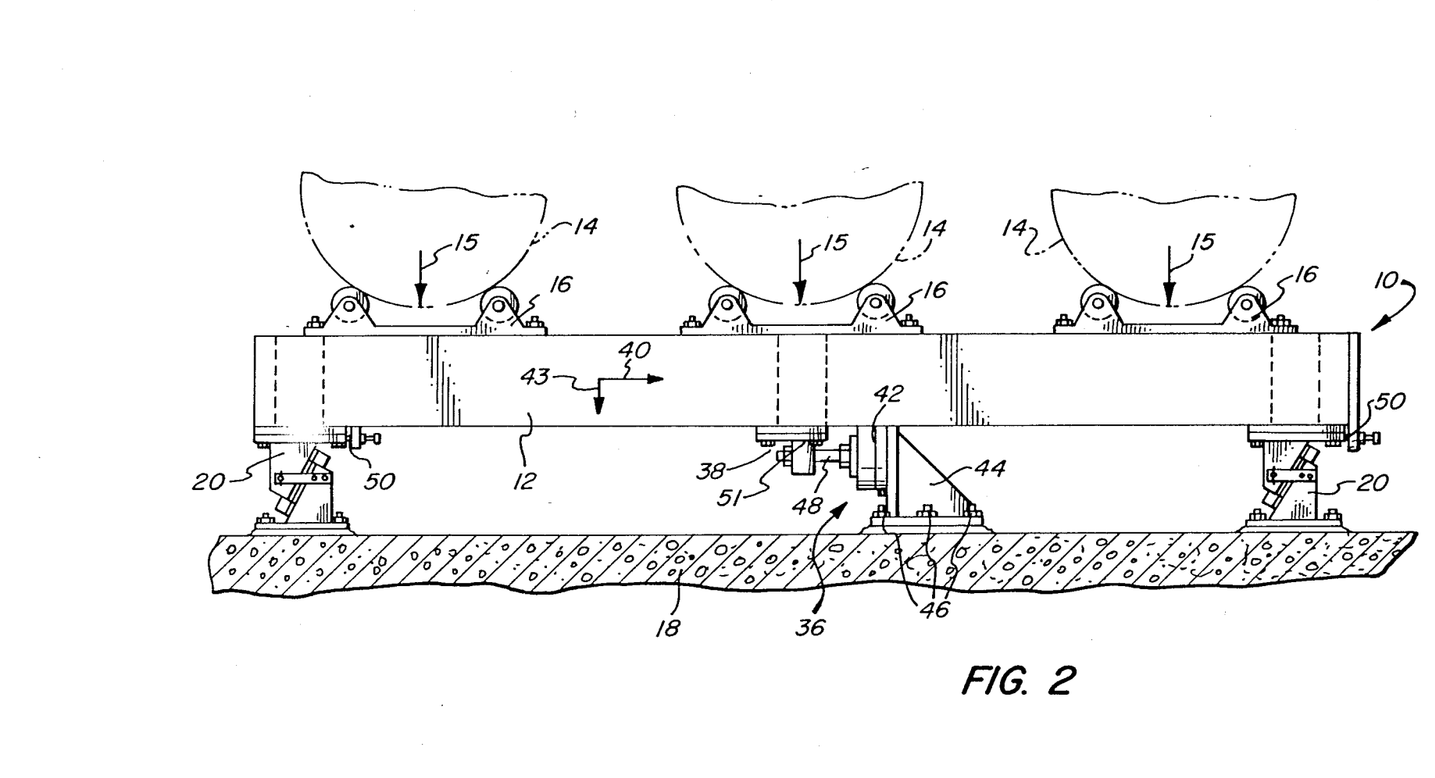
FIG. 2 is a side view of the scale assembly of FIG. 1, with a load shown thereon by broken lines.

With reference now to FIGS. 1 and 2, the scale assembly 10 includes a relatively rigid frame 12 for accepting a load, such as tanks 14 shown in FIG. 2. Tanks 14 are shown positioned on trunnion assemblies 16. The load creates downwardly directed loading forces represented in FIG. 2 by arrows or vectors 15. Trunnion assemblies 16 transmit forces 15 to frame 12. Frame 12 can be any load-receiving means, such as for example a platform, that is suitably adapted to receive loading forces. In FIG. 1, frame 12 is shown to be rectangular with longitudinal members 22 and 24; cross members 26, 28, and 30; and diagonal members 32 and 34.

The scale assembly 10 of the present invention is particularly useful for weighing heavy loads, such as tanks of industrial material, trucks, and the like. A typical load range would be approximately 100 to 100,000 pounds.

Frame 12 is shown mounted on a support surface 18, such as for example the concrete floor of FIGS. 1 and 2, by four flexure assemblies 20. Flexure assemblies 20 will be described in more detail below. Support surface 18 can be any relatively fixed base to which the scale assembly 10 is mounted in a relatively secure manner. The preferred embodiment shown in FIG. 1 uses four flexure assemblies 20, although it is understood that a greater or lesser number of assemblies 20 can be used so long as the frame 12 or other load-receiving platform is adequately supported in a stable manner.

A load cell 36 is positioned adjacent the symmetrical center 38 of frame 12 for receiving a horizontal component of the force associated with the horizontal deflection when a load such as tanks 14 is placed on frame 12. Load cell 36 can be any suitable force sensing assembly, such as for example a strain gauge. Cell 36 is preferably near the symmetrical center to achieve the advantages described below but could also be placed in other suitable configurations as well. The creation of a horizontal component is described in more detail below and is represented in FIG. 2 by an arrow or vector 40 shown in combination with vector 43, which indicates the vertically downward component of the loading force, as will be explained below. Load cell assembly 36 preferably comprises a hydraulic load cell 42 mounted by bracket assembly 44 and held rigidly in concrete floor 18 by suitable fastener means, such as anchor bolts 46. Load cell 42 can be any suitable force sensing means known in the art for receiving a substantially horizontal input force represented by vector 40 through linkage means 48 coupled to frame 12 by bracket assembly 51. It is understood that a plurality of load cells or other force sensing means could be used, so long as adequate force summing techniques are employed. Load cell 42 responds to a horizontal input force on link 48 by rendering an output signal that is indicative of the magnitude of the input force represented by vector 40. The precise indicating means, such as a dial or meter, is not critical and any such suitable indicating means known in the art can be used.

In accordance with the present invention, the load cell is positioned to receive a horizontal force 40 from frame cross member 28 at or near the symmetrical center 38 of frame 12. Diagonal frame members 32 and 34 converge on center 38 to further transmit the horizontal component 40 of the loading force to link 48. The centered symmetrical position o load cell assembly 36 is advantageous, in that it provides additional support for frame 12 and reduces the horizontal contraction of frame 12 that otherwise tends to occur when a heavy load is applied. Not only does this center mounting arrangement enhance the stability of the scale, it also improves the accuracy of the weighing operation by reducing horizontal motion and resultant change of the flexure angle.

The scale assembly 10 can be adjusted or calibrated to substantially span the scale by means of adjusting devices 50, one such device 50 being provided for each of the four flexure assemblies 20. As will be explained in more detail below, devices 50 permit adjustment or calibration of the horizontal position of the frame 12 with respect to the corresponding flexure assembly 20. This can vary the annular disposition of supporting flexure members to balance the scale and adjust the horizontal force component 40 input to load cell 42.

Figures 3, 3A:
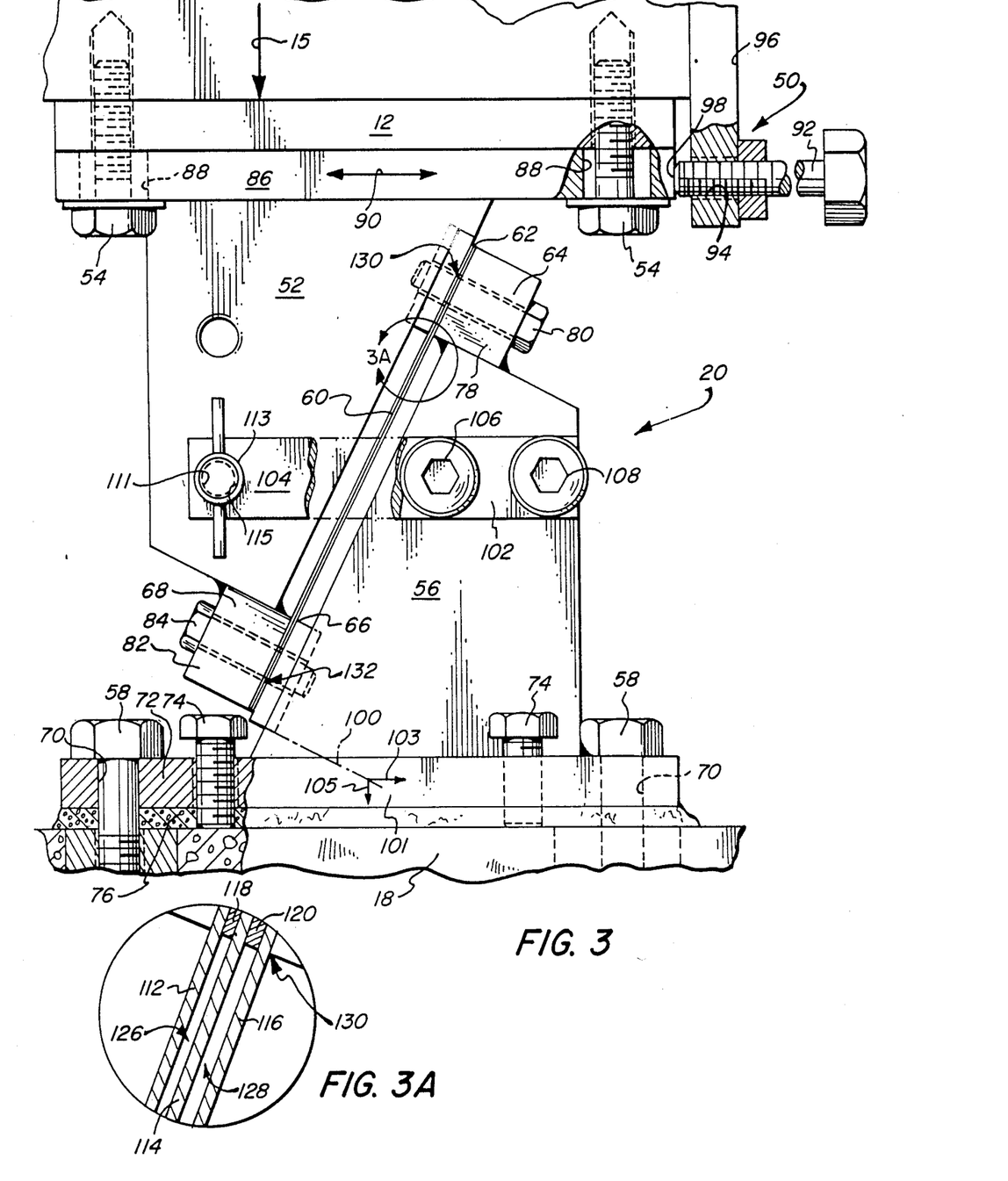
FIG. 3 is a side view of one preferred embodiment of the flexure assembly of the present invention.
FIG. 3A is a more detailed representation of part of the flexure assembly of FIG. 3 showing the laminated flexure structure of the present invention.
Figure 6:
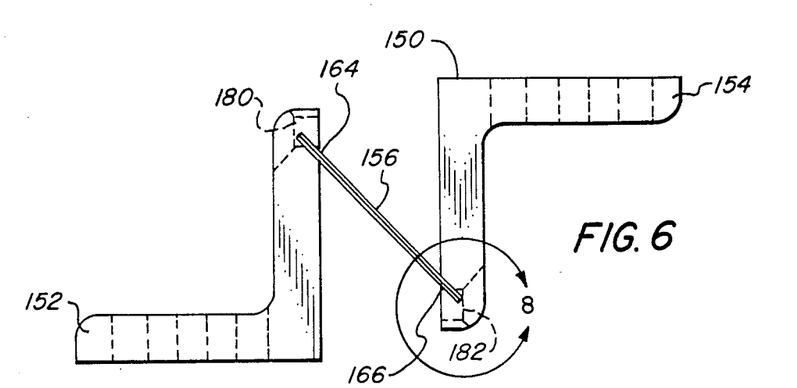
FIG. 6 is a side view of a further preferred embodiment of the present invention.
Figure 7:
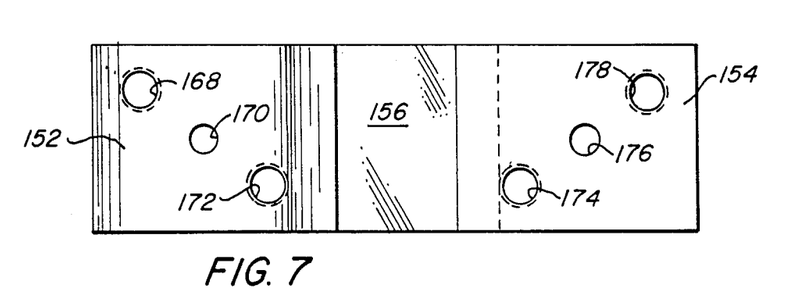
FIG. 7 is a side view of the embodiment of FIG. 6.
Figure 8:
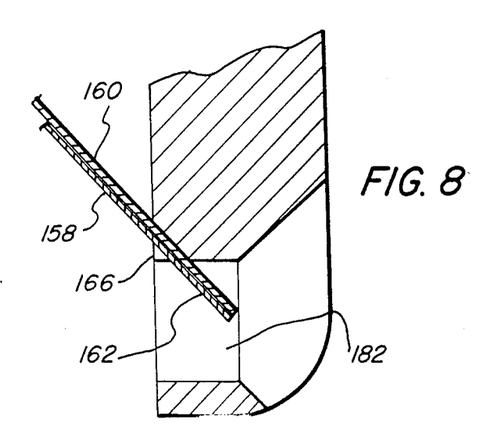
FIG. 8 is a detailed view of the flexure assembly as it is used in FIG. 6.

FIG. 3 in conjunction with the detailed view of FIG. 3A shows one preferred embodiment of the flexure assemblies 20 in more detail as it is used to support one corner of frame 12 on surface 18. Adjustment device 50 is also shown in more detail. It is understood that the assembly of FIG. 3 can be provided separately for use in constructing a scale assembly. FIGS. 6–8 as described below disclose a simple, more economical embodiment that can be provided for different scale assemblies.

With reference now to FIG. 3, it is seen that flexure assembly 20 primarily includes a first or upper body 52 for coupling to frame 12 through bolts 54; a second or lower body 56 from mounting onto surface 18 by any suitable means such as anchor bolts 58; and a flexible flexure member 60 disposed therebetween and fixed at its upper end 62 to suitable mounting means 64 on body 56 and fixed at its lower end 66 to suitable mounting means 68 on body 52. Flexure member 60 is disposed at an angle from the vertical of preferably about 26 degrees, although other angular dispositions can of course be used, and provides the connecting or supporting link between the frame 12 and its associated body 52 on the one hand and the support surface 18 and its associated body 56 on the other hand. It is this angular disposition of flexure member 60 that converts the downwardly directed loading forces 15 into a downward component 43 and horizontal component 40 as represented by the vector diagram in FIG. 2. The horizontal component is measured by hydraulic load cell 42.

The horizontal component 40 can be increased or decreased by changing the angle of member 60. The horizontal component is the loading force L times the tangent of the angle.

Lower body 56 can be any other suitable means for coupling assembly 20 to surface 18. As shown in FIG. 3, anchor bolts 58 pass through bolt holes 70 in bottom plate 72, which is welded or otherwise rigidly fixed to lower body 56. Leveling bolts or screws 74 permit appropriate leveling or adjusting of body 56 with respect to surface 18, after which grouting 76 can be inserted to further secure body 56. At the upper end of body 56, suitable mounting means 64, such as for example tab 78, is welded to body 56 for receiving bolts 80 to relatively rigidly secure flexure member to body 56.

Upper body 52 has similar means 68, including by way of example a tab 82 with bolts 84 at its lower end for relatively rigidly securing flexure member 60 thereto. Upper body 52 couples flexure assembly 20 to frame 12 through an upper plate 86, which is suitably fixed such as by welding to body 52. Bolts 54 pass through bolt holes 88 in plate 86 to fix the assembly 20 to frame 12. Holes 88 are oversized to permit plate 86 and therefore upper body 52 to slide back and forth with respect to frame 12 as indicated by arrow 90. The sliding or displacement of body 52 with respect to frame 12 is accomplished by device 50, which in its preferred embodiment includes by way of example only an adjusting threaded bolt or screw 92 mounted in a threaded bore 94 in an extended portion 96 rigidly affixed to platform 12. One end 98 on screw 92 abuts the edge of plate 86, which can be forced to slide by turning screw 92 in either a clockwise or counterclockwise direction. When screw 92 is reversed, the plate 86 will tend to return to its original position. While the side view of FIG. 3 shows only one screw 92, it can be seen by reference to FIG. 1 that there are two screws 92 per assembly 20. More such screws 92 can be added per assembly 20 if needed to force the plate 86 to slide with respect to frame 12. By loosening bolts 54 and using screw 92, the horizontal position of upper body 52 can be adjusted to the extent permitted by oversize bolt holes 88. The significance of this adjustment will be explained in more detail below.

Referring again to FIG. 3, it can be seen that lower body 56 for mounting on surface 18 is positioned relatively below upper body 52 and that bodies 56 and 52 face each other with flexure member 60 positioned therebetween. Flexure member 60 is relatively below body 52, but above body 56. Member 60 is sufficiently flexible to be capable of bending slightly to traverse a slight arc indicated by broken lines 100 in response to downwardly directed loading forces represented by vectors 15. Therefore, when a downwardly directed loading force is applied, the lower end of flexure member 60 tends to be pushed downwardly to traverse arc 100, thereby yielding both a horizontal and a vertical component of deflection as shown by vector diagram 101 with its horizontal 103 and vertical 105 components. In response to an applied load, frame 12 therefore tends to move in a horizontal direction as well to exert the force indicated as vector 40 in FIG. 2. In reacting against this tendency of frame 12, load cell 42 measures the horizontal component 40 which is related to the magnitude of the load. The loading force or weight can be readily calculated by taking into account the angular disposition, here approximately 26°, of the member 60.

FIG. 3 also shows latch 102. Latch member 104 extends across from body 56 to body 52. Latch member 104 is relatively rigidly attached to body 56 by means of fasteners 006 and 10 that engage suitably provided holes in body 56. A reference hole 111 is provided in body 52, and a latch pin 113 extends both through an alignment hole 115 in latch member 104 and reference hole 111 to thereby engage body 52 and hold body 52 in a preselected alignment or position with respect to body 56. In this manner, bodies 52 and 56 and the angular disposition of flexure member 60 therebetween can be calibrated at the factory and then relatively secured against moving with respect to each other during shipping and installation. In this way flexure member 60 can be protected against distortion or damage. Once installation of flexure assembly 20 has been accomplished, latch pin 113 can be removed to free body 52 to move with respect to body 56 as permitted by flexure member 60.

It can be seen in FIG. 3 with the aid of detailed FIG. 3A that flexure member 60 is not a solid member, but rather comprises a laminated or stacked structure of flexible leaves, preferably leaf springs. This structure can be seen in more detail by further reference to FIGS. 4 and 5. Laminating the flexure members improves the zero shift characteristics of the flexure assembly and therefore the scale.

Figure 4:
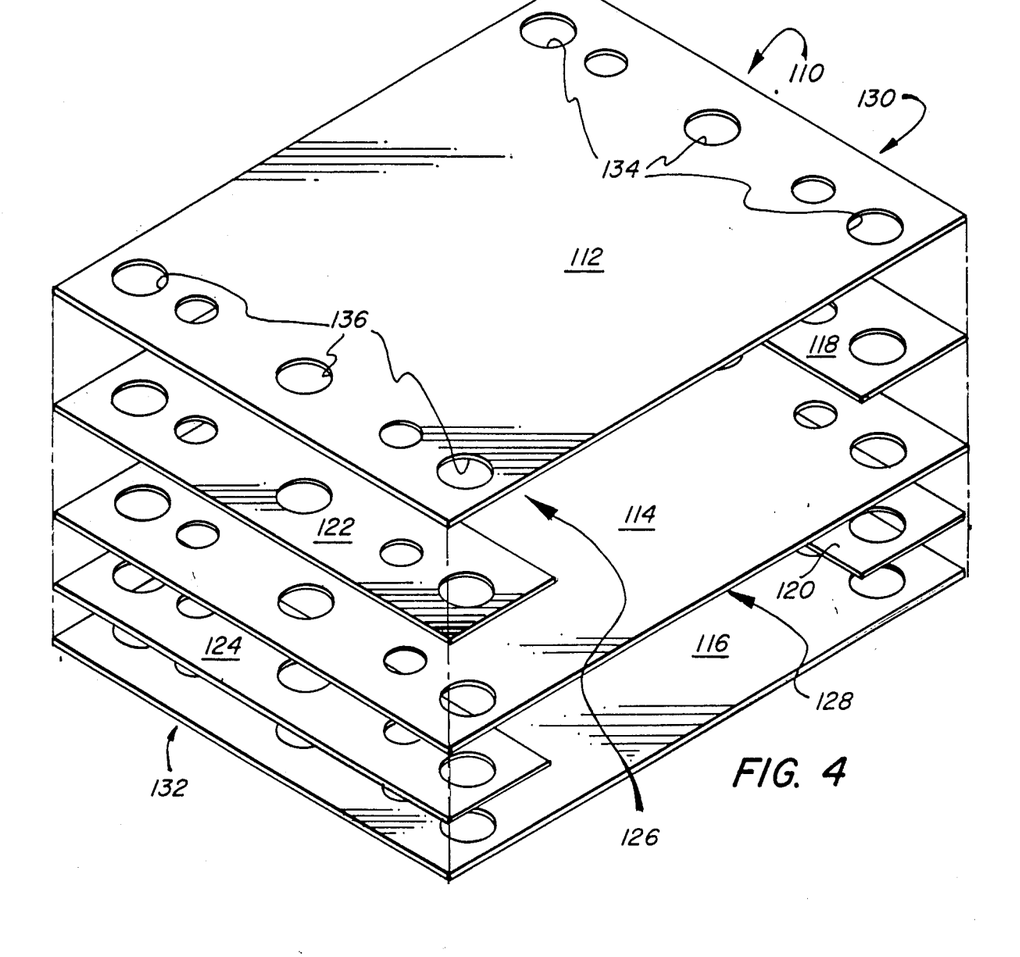
FIG. 4 is an exploded view of the laminated flexure of the embodiment of FIG. 3.

The flexure 60 of the present invention is substantially planar when in a state that is not deflected or deformed by loading forces 15. All flexures 60 of the four flexure assemblies 20 lie in substantially the same or parallel planes. Even under a loading condition and the resultant deflection, the deflection or deformation is slight and flexures 60 still occupy relatively the same or parallel planes FIG. 4 shows in an exploded view that flexure 60 comprises a stack 110 of three flexible leaves such as for example leaf springs 112, 114, and 116. These leaf springs are preferably formed from sheets of stainless steel, (301, ¾-full hard) although other suitable materials such as alloys or corrosion resistant material could be used as well. These leaf springs 112, 114, and 116 should be sufficiently rigid to hold frame 12 above support 18, but sufficiently flexible to bend or deflect slightly under loading as described above. While the preferred embodiment as described herein comprises a stack or laminate structure of three leaf springs, it is understood that the lamination can be formed of two or more springs used depending upon the magnitude of the loads to be weighed and the desired design characteristics. In the preferred embodiment by way of example only, each leaf spring is formed from stainless steel having the size 0.020 inches.

The springs 112, 114, and 116 are preferably separated from each other by shims 118, 120, 122, and 124 to provide spaces 126 and 128 therebetween. Shims 118, 120, 122, and 124 are preferably formed from 0.007 stainless steel (301¾-full hard), although other suitable materials such as alloys or corrosion resistant material may also be suitable. The stack 110 of springs 112, 114, and 116 with the shims 118 and 120 therebetween are joined along a first side 130 thereof to lower body 56. Stack 110 of springs 112, 114, and 116 with shims 122 and 124 therebetween are joined along an opposite side 132 thereof to upper body 52. Bolts 80 pass through bolt holes 134 and tabs such as tab 64 to affix stack 110 relatively rigidly to body 56, while bolts 84 pass through bolt holes 136 and tabs such as tab 82 to affix stack 110 rigidly at its lower end to body 52.

Figure 5:
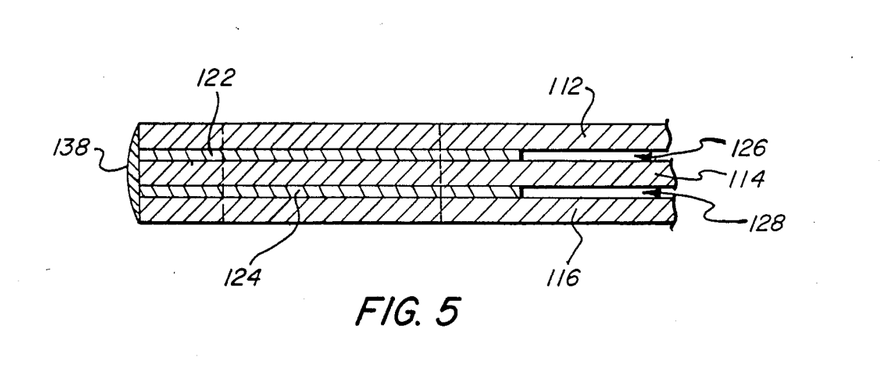
FIG. 5 is a more detailed view of one end of the laminated flexure of the embodiment of FIG. 3.

As shown in FIG. 5, a weldment 138 may also be employed to hold the stack 110 together.

Shims 118, 120, 122, and 124 inhibit adjacent springs from touching or rubbing against each other along the major portions of their surfaces throughout the range of the arcuate deflection. This plate separation enhances the linearity of the scale, in that friction between the leaf springs in the stack is reduced. Accordingly, the relationship between the loading force and the horizontal component 40 as measured by load cell 42 is more nearly linear over the range of the scale, thereby improving the simplicity and accuracy of the scale.

FIGS. 3-5 show a heavy duty embodiment of the present invention, but it is understood that the present invention can also be used in less complex and lighter weighing applications. FIGS. 6 through 8 disclose a simpler, more economical flexure assembly.

FIG. 6 shows generally at 150 an angle flexure assembly that uses two L-shaped brackets 152 and 154 joined by a flexure member 156. FIG. 7 is a top view of FIG. 6. As shown more clearly in FIG. 8, flexure member 156 is made of two resilient leaves 158 and 160 separated at their ends by shims such as shim 162. The flexure members and shims are preferably made of stainless steel, although other suitable alloys could be used as well. Flexure member 156 is preferably welded at opposite ends 164 and 166 thereof to brackets 152 and 154 respectively. Holes 180 and 182 can be used to facilitate the welding operation.

Brackets 152 and 154 have holes 168, 170, 172, 174, 176, and 178 formed therein to facilitate fastening bracket 152 to a relatively fixed surface and bracket 154 to the load-receiving platform, or vice versa.

Accordingly, it can be seen that a smaller, simpler, and more economical version of the assemblies of FIG. 3 can also be provided in accordance with the present invention.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A flexure assembly for mounting a load-receiving platform to a fixed base, said base having associated therewith a force sensing device for coupling to said platform, said assembly comprising at least one flexure member including a stack of at least two flexible leaves, said stack being rigidly coupled along a first side thereof to said platform, said stack being rigidly coupled along an opposite side thereof to said base, said stack being inclined from the vertical and being sufficiently rigid to support said platform from said base, said stack further being sufficiently flexible to tend to deflect and traverse a slight arc in response to a loading force being applied to said platform by receiving a load thereon, each of said leaves having a substantially planar shape when in a nondeflected state and lying in substantially parallel planes when in the nondeflected state, whereby said force sensing device can be coupled to said platform along a substantially horizontal axis to thereby render an indication of the magnitude of said load.

2. The flexure assembly of claim 1, wherein each said stack comprises a plurality of separate leaves joined together substantially rigidly at their respective opposite ends and between those ends each said leaf spaced apart from adjacent leaves.

3. The flexure assembly of claim 2, further including shims placed between adjacent leaves at their respective opposite ends, said shims being relatively small compared to said leaves, a first set of said shims being aligned along said first side and a second set of said shims being aligned along said opposite side.

4. The flexure assembly of claim 3, wherein said shims are welded in said alignment with said leaves along said first and second sides.

5. The flexure assembly of claim 4, wherein said leaves each have a relatively uniform thickness from end to opposite end.

6. The flexure assembly of claim 5, wherein said springs comprise stainless steel.

7. A flexure assembly for mounting a load-receiving platform to a fixed base, said base having associated therewith a force sensing device for coupling to said platform, said assembly comprising first means for coupling said assembly to said platform; second means for coupling said assembly to said base, said second coupling means being positioned relatively below said first coupling means; at least one flexure member including a stack of at least two flexible leaves, said flexure member being positioned between said first and second coupling means for joining said first coupling means to said second coupling means, said member being rigidly connected at the lower end thereof to said first coupling means, said member being positioned relatively below said first coupling means, said member being rigidly connected at the upper end thereof to said second coupling means, said member being positioned relatively above said second coupling means, said first and second coupling means substantially facing each other with said member therebetween; said stack being inclined from the vertical and being sufficiently rigid to support said platform from said base, said stack further being sufficiently flexible to tend to deflect and traverse a slight arc in response to a loading force being applied to said platform by receiving a load thereon, each of said leaves having a substantially planar shape when in a non-deflected state and lying substantially parallel planes when in the nondeflected state, whereby said force sensing device can be coupled to said platform along a substantially horizontal axis to thereby render an indication of the magnitude of said load.

8. The flexure assembly of claim 7, wherein said first coupling means is movably adjsutable with respect to both said platform and said second coupling means so as to vary the lateral distance between said first and second coupling means to adjust the angle at which the member is inclined from the vertical, whereby said assembly can be calibrated.

9. The flexure assembly of claim 8, wherein said first coupling means is slidable with respect to said platform, and said assembly further comprises means rigidly attached to said platform for displacing said first coupling means with respect to said platform, whereby said first coupling means can be slidably positioned at varying positions under said platform.

10. The flexure assembly of claim 9, wherein said displacing means comprises a threaded member mounted in a threaded receptacle on said platform positioned to engage said first coupling means and displace said coupling means in response to rotation of said threaded member.

11. The flexure assembly of claim 10, further comprising means extending across said first coupling means and said second coupling means for linking said two coupling means in a relatively fixed orientation with respect to each other, said linking means being removable to free said two coupling means to move with respect to each other in response to a load on said platform.

12. A scale assembly comprising:
(a) a load-receiving platform for accepting a loading force;
(b) a plurality of semi-rigid, laminated leaf means for mounting said platform to a relatively fixed support surface, said leaf means for coupling at one end to said support surface and at the other end to said platform, said leaf means being inclined from the vertical and being sufficiently rigid to support said platform from said surface, said leaf means further being sufficiently flexible to have a tendency to deflect in an arc having both a horizontal and vertical direction in response to a load being applied to said platform by receiving weight thereon;
(c) at least one force sensing means centered substantially symmetrically with respect to said plurality of leaf means underneath said platform and coupled to said platform along a substantially horizontal axis, said force sensing means for receiving a force directed along said axis and in response thereto rendering an output signal indicative of the magnitude of said loading force, whereby said force sensing means can measure the loading force by responding to the tendency of the platform to deflect in a horizontal direction in response to said loading force.

13. The scale of claim 12, further including means for adjusting the horizontal displacement between a first reference point on said platform and a second reference point associated with said leaf means connected to said platform, whereby a zero reference point can be selected to calibrate said scale.

14. The scale of claim 13, wherein said force sensing means comprises at least one hydraulic load cell.

15. The scale of claim 14, wherein said leaf means when in a nondeflected state comprise at least one substantially planar flexure, said flexure lying in a plane inclined from the vertical, whereby the traverse of said arc when a load is applied has both a horizontal and a vertical component related to the angle of inclination.

16. The scale of claim 15, wherein said flexure comprises a stack of at least two leaf springs, said stack being joined along a first side thereof to a first means for coupling said stack to said platform, said stack being joined along an opposite side thereof to a second means for coupling said stack to said base, each of said springs in said stack further lying in substantially parallel planes when in said nondeflected state.

17. The scale of claim 16, wherein each said spring in said stack is separated from each adjacent spring in said stack by shim means placed between adjacent springs, whereby said adjacent springs are inhibited from touching each other along the major portion of their surfaces at any point during deflection through said arc.

18. The scale of claim 17, wherein said shim means are relatively small compared to said springs, and a first set of said shim means are aligned along said first side and a second set of said shim means are aligned along said opposite side.

19. The scale of claim 18, wherein said shim means sets are welded in said alignment with said springs along said first and second sides.

20. The scale of claim 19, wherein said springs each have a uniform thickness.

21. The scale of claim 20, wherein said springs comprise stainless steel.

22. A scale comprising:
(a) a platform for accepting a downwardly directed loading force;
(b) at least four leaf spring assemblies for suspending said platform from a relatively fixed support surface, said assemblies being space about and adjacent to the perimeter of said platform to support said platform therefrom in a substantially balanced manner, each said assembly having a stack of leaf springs separated by shims, said stack being fixedly attached along a first side thereof to a first coupling means associated with said surface and being fixedly attached along a second side thereof opposite said first side to a second coupling means associated with said platform, each said stack being inclined from the vertical at a preselected angle, first and second ones of said stacks lying in substantially a first plane and the other two said stacks lying in a second plane substantially parallel to the first, said springs being flexible and sufficiently rigid to support said platform away from said surface, while being sufficiently flexible to deflect in a direction having both a downwardly directed component and a vertically directed component in response to application of said loading force; and
(c) load cell means operatively connected to said platform through a horizontal link to respond to the horizontal component of said deflection by producing a signal indicative of the magnitude of the loading force, whereby said signal varies with said magnitude in a substantially linear mathematical relationship.

23. The scale of claim 22, wherein said load cell means is at least one hydraulic load cell mounted in a relatively fixed manner with respect to said surface at the substantially symmetrical center of said platform.

24. The weighing device of claim 23 wherein said platform is for accepting a downwardly directed loading force and said leaf spring assemblies are for supporting said platform above said surface, the second side of each said stack being positioned generally in a downward direction from said first side to thereby suspend said platform from said first coupling means and above said surface.

* * * * *